(12) United States Patent
Alden

(10) Patent No.: US 10,748,667 B1
(45) Date of Patent: Aug. 18, 2020

(54) NUCLEAR FISSION PASSIVE SAFETY AND COOLING SYSTEM

(71) Applicant: John S. Alden, Chicago, IL (US)

(72) Inventor: John S. Alden, Chicago, IL (US)

( * ) Notice: Subject to any disclaimer, the term of this patent is extended or adjusted under 35 U.S.C. 154(b) by 0 days.

(21) Appl. No.: 16/737,264

(22) Filed: Jan. 8, 2020

(51) Int. Cl.
| | | |
|---|---|---|
| *G21C 13/093* | (2006.01) | |
| *G21C 11/08* | (2006.01) | |
| *G21C 9/00* | (2006.01) | |
| *G21C 15/18* | (2006.01) | |

(52) U.S. Cl.
CPC .............. *G21C 15/18* (2013.01); *G21C 9/001* (2013.01); *G21C 11/083* (2013.01); *G21C 13/093* (2013.01)

(58) Field of Classification Search
CPC ........ G21C 15/18; G21C 9/001; G21C 11/02; G21C 11/08; G21C 11/081; G21C 11/083; G21C 11/085; G21C 11/086; G21C 13/02; G21C 13/093; G21D 1/02; G21F 7/00
See application file for complete search history.

(56) References Cited

U.S. PATENT DOCUMENTS

| | | | |
|---|---|---|---|
| 3,396,079 A | 8/1968 | Sergio et al. | |
| 3,563,855 A | 2/1971 | Marko | |
| 3,702,802 A | 11/1972 | Jansen, Jr. | |
| 3,893,508 A | 7/1975 | Nemet | |
| 3,979,866 A | 9/1976 | Prescott | |
| 4,123,325 A * | 10/1978 | Ichiki | G21C 9/001 |
| | | | 376/293 |
| 4,795,607 A | 1/1989 | Reutler et al. | |
| 2018/0190398 A1 | 7/2018 | Singh et al. | |
| 2020/0027593 A1* | 1/2020 | Beckett | G21C 11/08 |

FOREIGN PATENT DOCUMENTS

| | | |
|---|---|---|
| CN | 104916333 B | 5/2017 |
| CN | 106531244 B | 1/2018 |
| CN | 109859861 A | 6/2019 |
| WO | 9832134 A1 | 7/1998 |

OTHER PUBLICATIONS

Lochbaum, David. Nuclear Plant Containment Failure: Overpressure, in All Things Nuclear Blog, Union of Concerned Scientists. https://allthingsnuclear.org/dlochbaum/nuclear-plant-containment-failure-overpressure. May 3, 2016.

* cited by examiner

*Primary Examiner* — Sharon M Davis
(74) *Attorney, Agent, or Firm* — Lesley A. Wallerstein, LLC

(57) ABSTRACT

A passive safety and cooling system for nuclear fission reactors powered by a bundle of radioactive fuel rods enclosed in a pressure vessel provides four redundant levels of dissipating and containing heat. Metal layered with carbon nanotube surrounds the pressure vessel, lines the system's floor, and studs a concrete containment dome. A retractable ceramic tile outer dome contains, absorbs and blocks any remaining heat or nuclear reactions, and optionally, releases them to the atmosphere, for the ultimate dissipation.

15 Claims, 10 Drawing Sheets

NUCLEAR FISSION PASSIVE SAFETY AND COOLING SYSTEM

CROSS-REFERENCE TO RELATED APPLICATION (not applicable)

STATEMENT REGARDING FEDERALLY SPONSORED RESEARCH OR DEVELOPMENT (not applicable)

NAMES OF PARTIES TO A JOINT RESEARCH AGREEMENT (not applicable)

REFERENCE TO SEQUENCE LISTING, A TABLE OR A COMPUTER PROGRAM LISTING COMPACT DISC APPENDIX (not applicable)

FIELD OF THE INVENTION

This invention relates to a passive safety and cooling system for nuclear fission power plants having a bundle of radioactive fuel enclosed in a pressure vessel.

BACKGROUND OF THE INVENTION

Nuclear power plants remain a major source of clean energy. For all its benefits, the awesomeness of nuclear energy evokes (justified) fear of uncontrolled heat, devastating human loss, and lingering radioactive contamination. We remember places like Three Mile Island and Chernobyl, and more recently, Fukushima, from the "devastation," "destruction," "meltdown," "Armageddon" and "catastrophe" that happened and left their mark there.

Calling these tragedies "accidents" does not trivialize the loss but rather, underscores the potential for human error and the need for redundant containment systems that take this into account. Uranium is the most abundant and best-known source of nuclear power. Uranium dioxide is compacted into small cylinders, which are in turn stacked to form longer cylindrical fuel rods. Fuel rods are clad in neutron-absorbing steel or zirconium alloy. Fuel rods are bundled together to form a fuel assembly. Uranium naturally decays, producing neutrons, which in turn provoke other nearby uranium atoms to decay. This is the chain reaction. This reaction generates extreme amounts of heat quickly. To moderate this reaction, and contain the heat, the fuel assembly is bathed in cooled water and retained within a reinforced pressure vessel. In this way, the pressure vessel is like a self-heating tea kettle, but with two spouts. It has an inlet for cool water, and a corresponding outlet for boiling water or steam. Downstream of the pressure vessel, the outlet carries the resulting steam to a turbine. The force of the steam rotates the turbine to generate electricity, which can be delivered to homes and businesses. A pump further downstream from the turbine sends the steam to be cooled and condensed into liquid water. This water is recirculated to the "kettle" to continue cooling the fuel assembly.

As long as there is enough volume of cool water to cover the fuel, the system can keep the pressure vessel to about 500 F. If the pump fails, not enough cool water fills can cover the fuel assembly. The fuel assembly continues to generate heat from fission. While the ambient air does dissipate some of the heat, it does not do so as well as water. Heat builds, as it is not removed by the normal circulation of water through the pressure vessel. Control rods dipped into the water bath moderate and stop the chain reaction itself but are not enough to remove the heat of the reduced, but ongoing, fission. Unchecked, the temperature in the pressure vessel can rise to 2200 F. This extreme heat must go somewhere, so, after the remaining water is boiled off, it bursts or melts the pressure vessel, and possibly the containment structure as well.

The pressure vessel is typically made of reinforced steel or other strong material to withstand the pressure of the chain reaction and also absorb neutrons. The pressure vessel is not indestructible. Given enough heat, the steel will melt, forming a pool on the containment vessel floor. Given enough pressure, the pressure vessel will rupture. Therefore, there must be a way to remove the heat and contain the radiation in case tie pressure vessel fails. Current practice is to contain the pressure vessel within some kind of containment structure. Containment structures are often made of reinforced concrete or steel, and do just that, provide backup heat and radiation containment means.

BRIEF SUMMARY OF THE INVENTION

Because even state of the art nuclear power plants are vulnerable to failure, I have created a passive safety and cooling system which provides redundant means of dissipating heat and nuclear energy. The pressure vessel is defined by, and is surrounded by, a heat pass column comprising two layers of steel surrounding a layer of graphene. Two layers of metal provide strength and graphene absorbs heat and neutrons. This heat pass column stands supported in thermal communication on, a cooperating heat pass disk having the same layered composition. Any heat or nuclear energy that might escape the pressure vessel, can be absorbed by the disk.

A concrete containment dome sits atop and encloses the column and disk assembly like a bell jar. The containment dome has a hole in the top, the same diameter as the heat pass column. The dome is also the same height as the heat pass column, so that the column inserts into the top of the dome. This creates a torus, or donut shape of air between the column and the dome.

I improve upon conventional concrete containment domes by embedding the dome with individual heat pass segments of metal and graphene. These segments provide a third means of absorbing heat and nuclear energy. The heat pass segments carry and transfer any ambient heat escaping the pressure vessel to the outside of the containment dome. In case three means of absorbing and dissipating excess heat and nuclear energy is not sufficient, I enclose the entire structure in a second, retractable, dome of insulating ceramic tiles. These tiles store, and then release, excess heat.

REFERENCE NUMERALS

Figure 1:
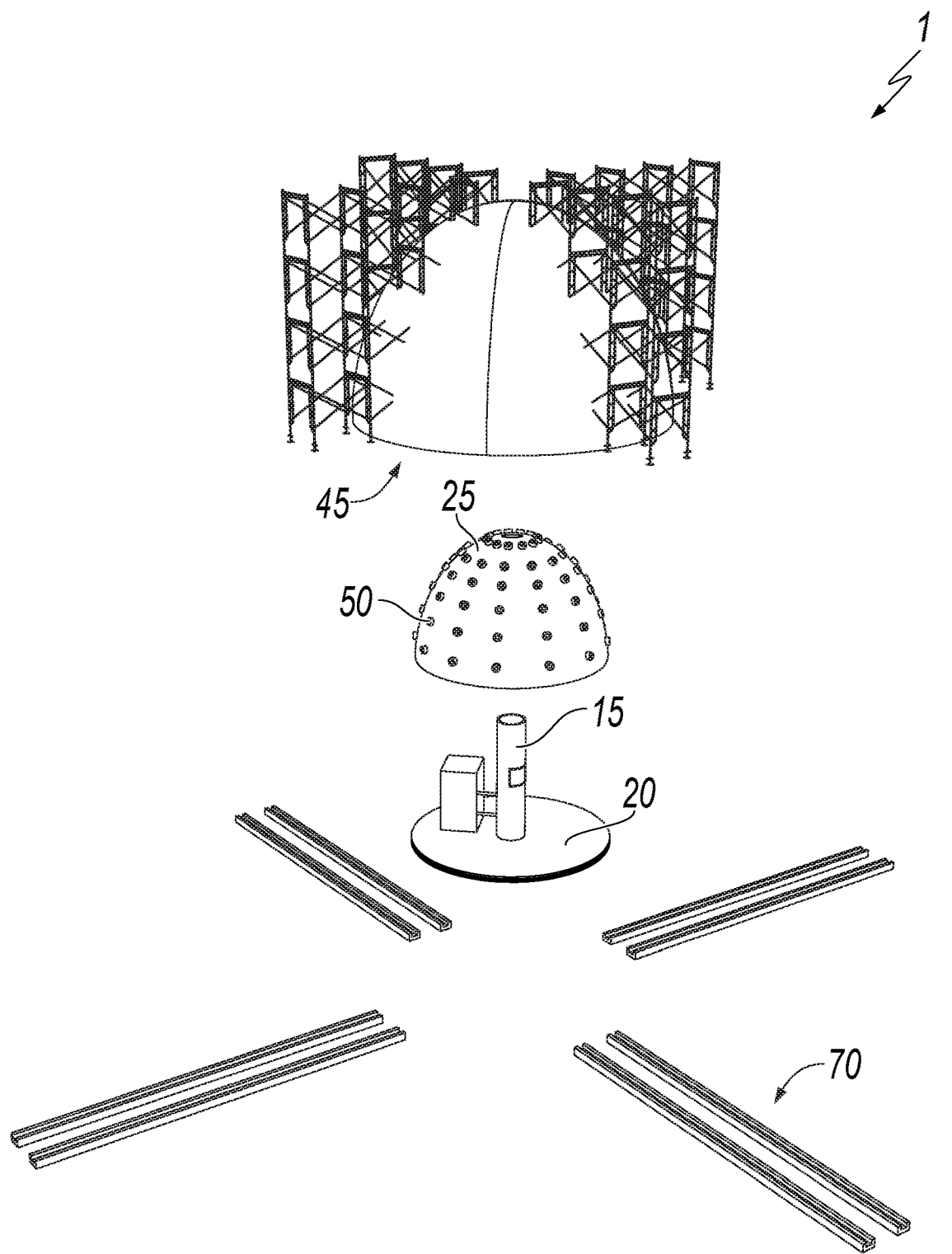
FIG. 1 is a top perspective and exploded view of a nuclear fission passive safety and cooling system.

1. Passive Safety and Cooling System
5. Bundle of radioactive fuel
10. Pressure vessel
15. Heat pass column
20. Heat pass disk
25. Concrete containment dome
30. Top of containment dome
35. Sidewall of containment dome
40. Torus of air space (between heat pass column, heat pass disk and containment dome)
45. Layer of retractable insulating tiles
50. Heat pass segment (embedded in containment dome)
55. Hollow access chamber
60. Graphene core (of individual heat pass segment)
65. Metal sheath (surrounding graphene core of heat pass segment)
70. Tracks

DETAILED DESCRIPTION OF THE INVENTION

FIG. 1 shows at a very high level a preferred embodiment of a passive safety and cooling system for a nuclear power core contained within a pressure vessel. The system comprises four primary components, which provide four separate levels of absorbing, containing and dissipating excess heat produced by nuclear fission reactions. FIG. 1 presents these components in an axial exploded view, so the reader can appreciate their relative size and position. Please note in particular heat pass column 15 which surrounds the pressure vessel (not shown in this view), heat pass disk 20, a plurality of heat pass segments 50 embedded in a concrete containment dome 25 and an outer dome 45 of insulating ceramic tiles. Please note a dividing line roughly halfway down the front of the outer dome 45. In this embodiment, outer dome 45 is split into four sections—the rear two sections are not shown. Each section of the outer dome is attached to a scaffolding, which in turn rest on casters. A set of four doubled tracks 70 are laid perpendicular to each other and are fixed to the earth.

Figure 2:
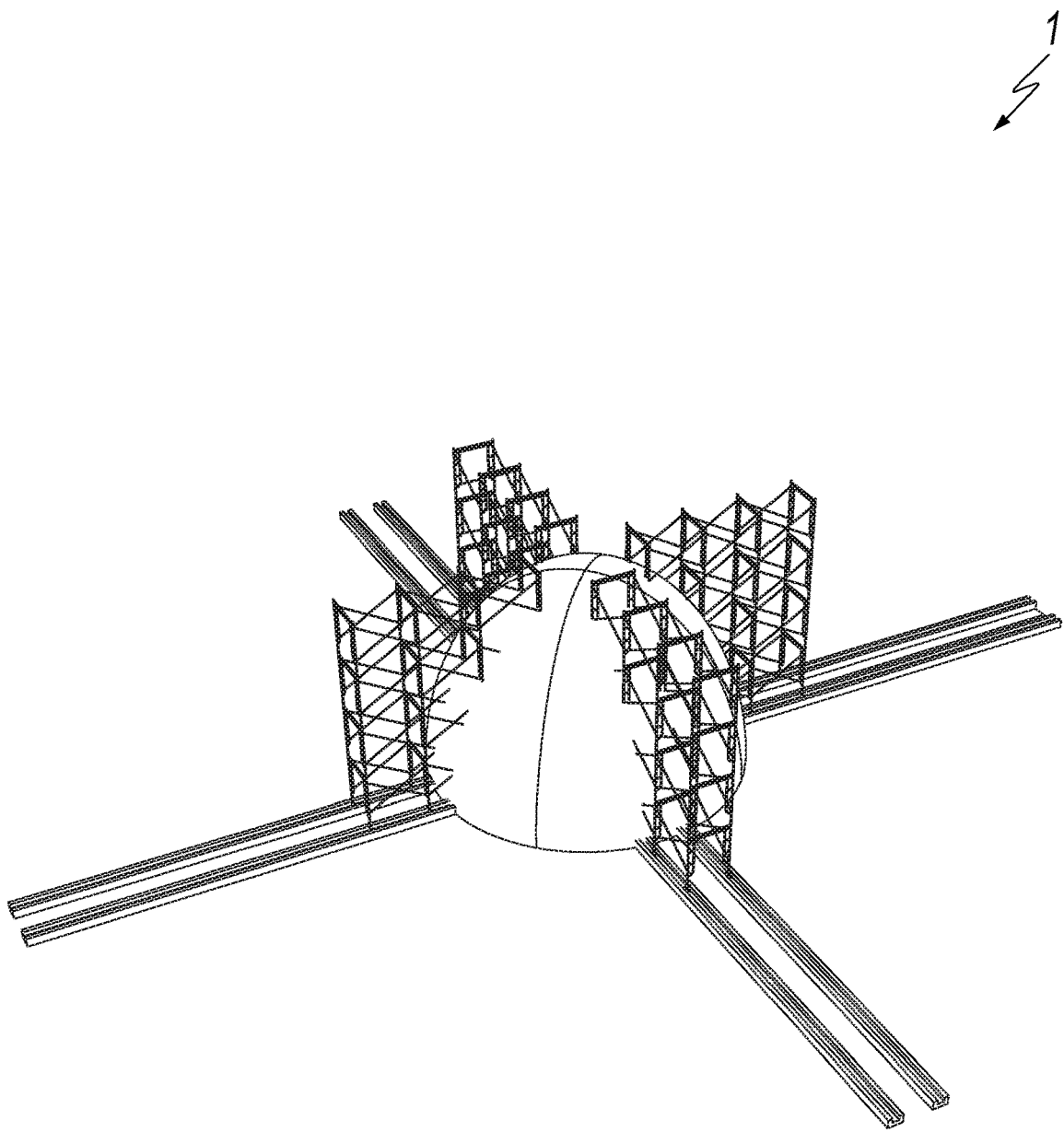
FIG. 2 is a top perspective view of the nuclear fission passive safety and cooling system of FIG. 1, shown in an assembled and closed configuration.
Figure 3:
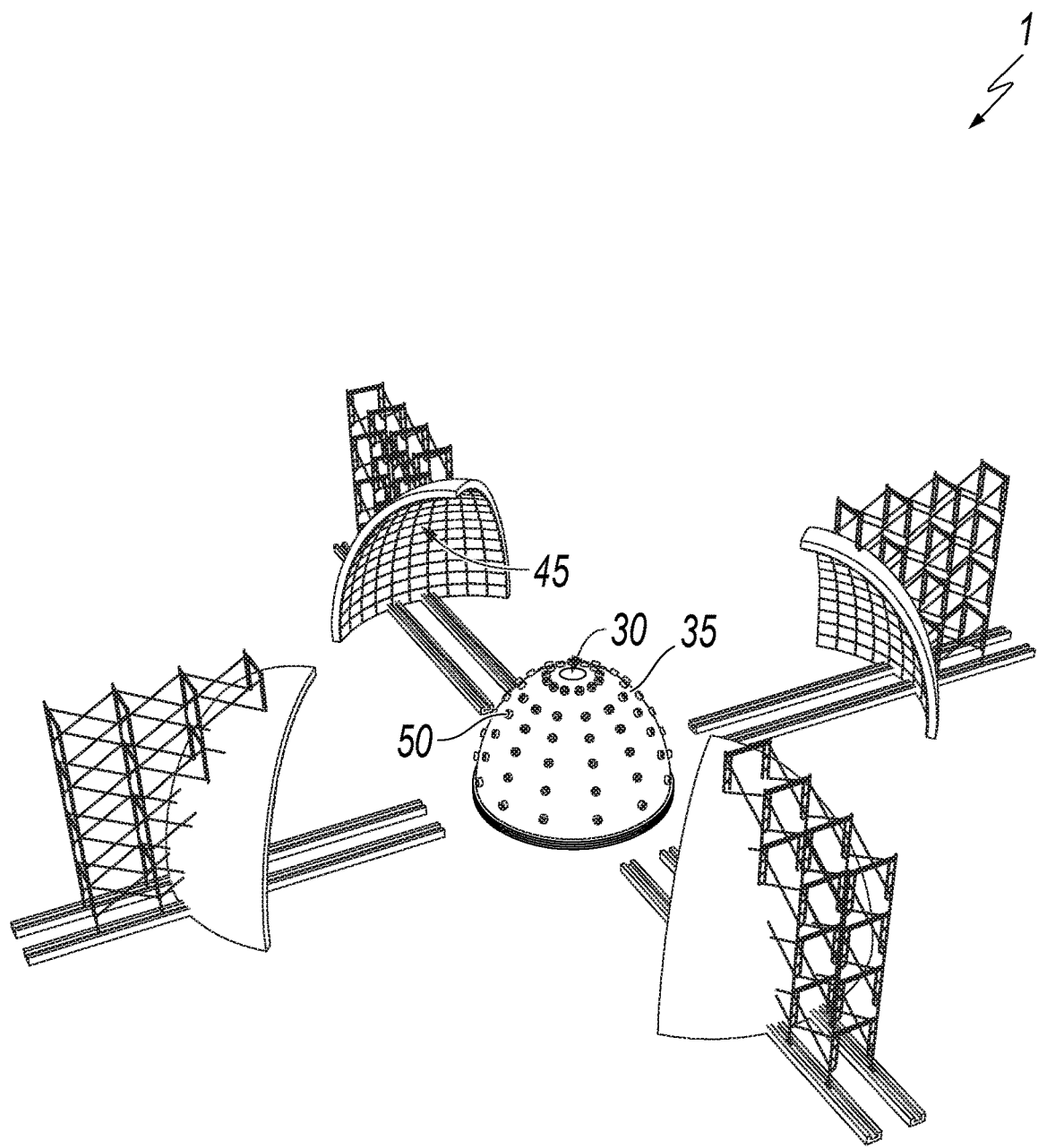
FIG. 3 is a top perspective view of the nuclear fission passive safety and cooling system of FIG. 1, shown in an assembled and open configuration.
Figure 4:
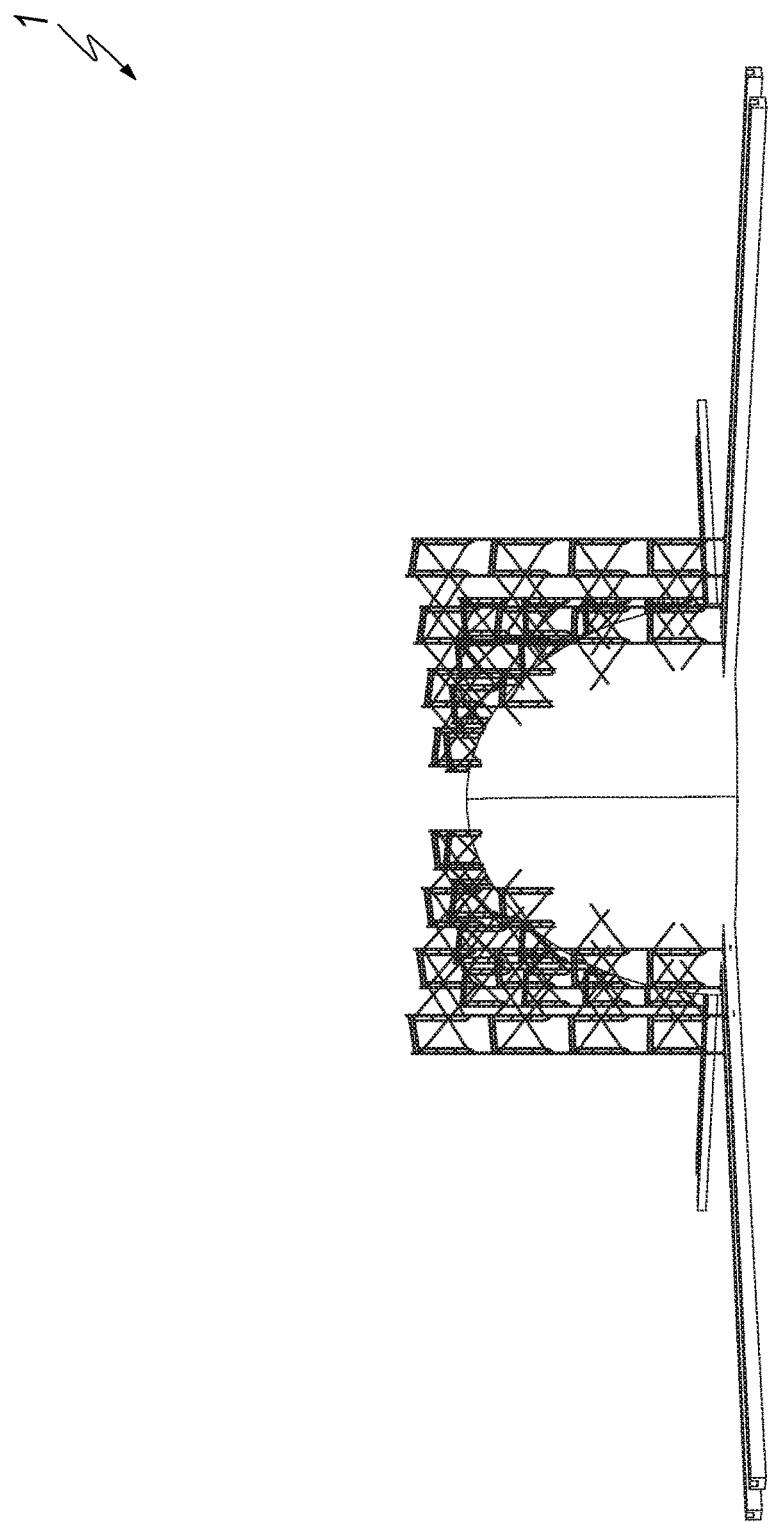
FIG. 4 is a front view of the nuclear fission passive safety and cooling system of FIG. 1, shown in a closed configuration
Figure 5:
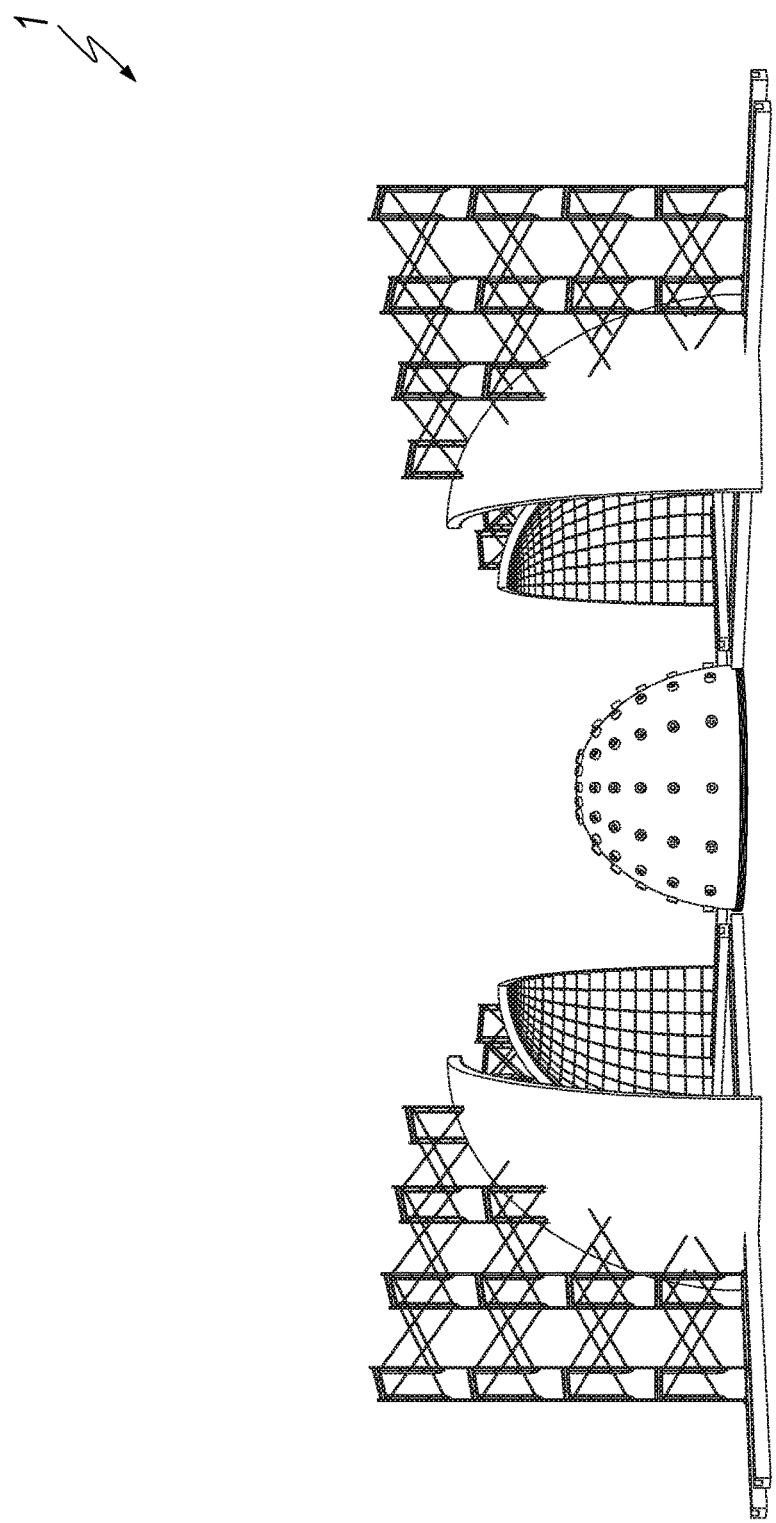
FIG. 5 is a front view of the nuclear fission passive safety and cooling system of FIG. 1, shown in an open configuration.
Figure 6:
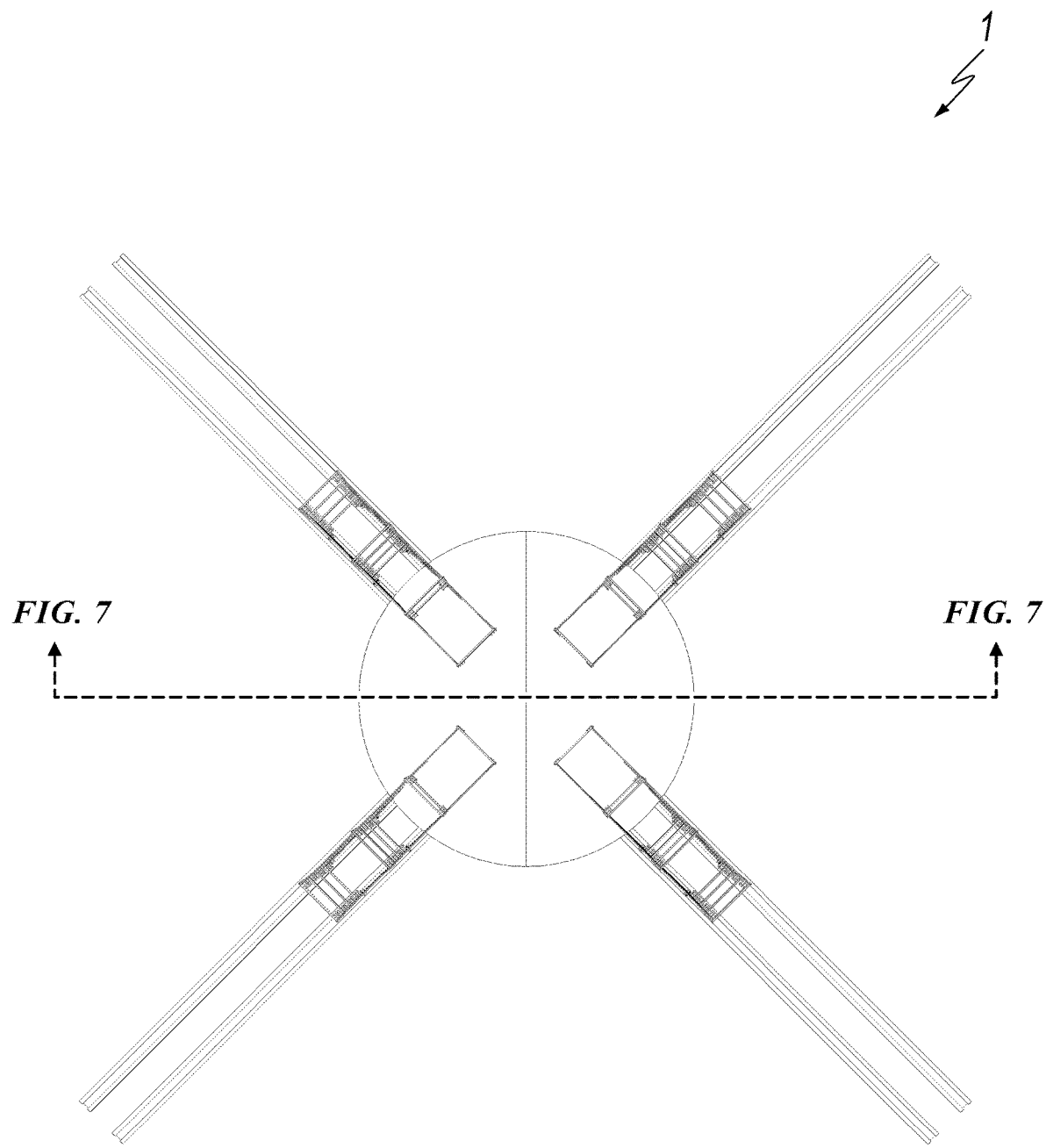
FIG. 6 is a bottom view of the nuclear fission passive safety and cooling system of FIG. 1, shown in a closed configuration.

In FIGS. 2-6, we see the system in an assembled configuration. In these views, we see all four sections of outer dome 45, each with its scaffolding, which has casters set into grooves of corresponding dedicated track. The sections of outer dome have spaced apart notches cut along a bottom edge corresponding to cross sections of the track. In this way, each outer dome section can glide forward and backward along its track, just grazing the earth, while not allowing any air to pass therebeneath. This allows the segments to slide toward each other, closing the dome, and away from each other, opening the dome. Opening the outer dome reveals an inner dome, with heat pass segments embedded throughout. FIGS. 2 and 4 show the system in a closed configuration; FIGS. 3, 5 and 6 show the system in an open configuration.

When the outer insulating tiles retract, the heat pass elements contact the atmosphere. Air and space are effective means of dissipating heat. In normal and non-urgent operation, the outer dome remains closed and the internal structures of the system (layered heat pass column, layered heat pass disk, and layered heat pass segments) manage the heat. If those structures fail or need support, an operator can retract the insulating tile sections to any position. This releases any ambient heat to the environment.

Figure 7:
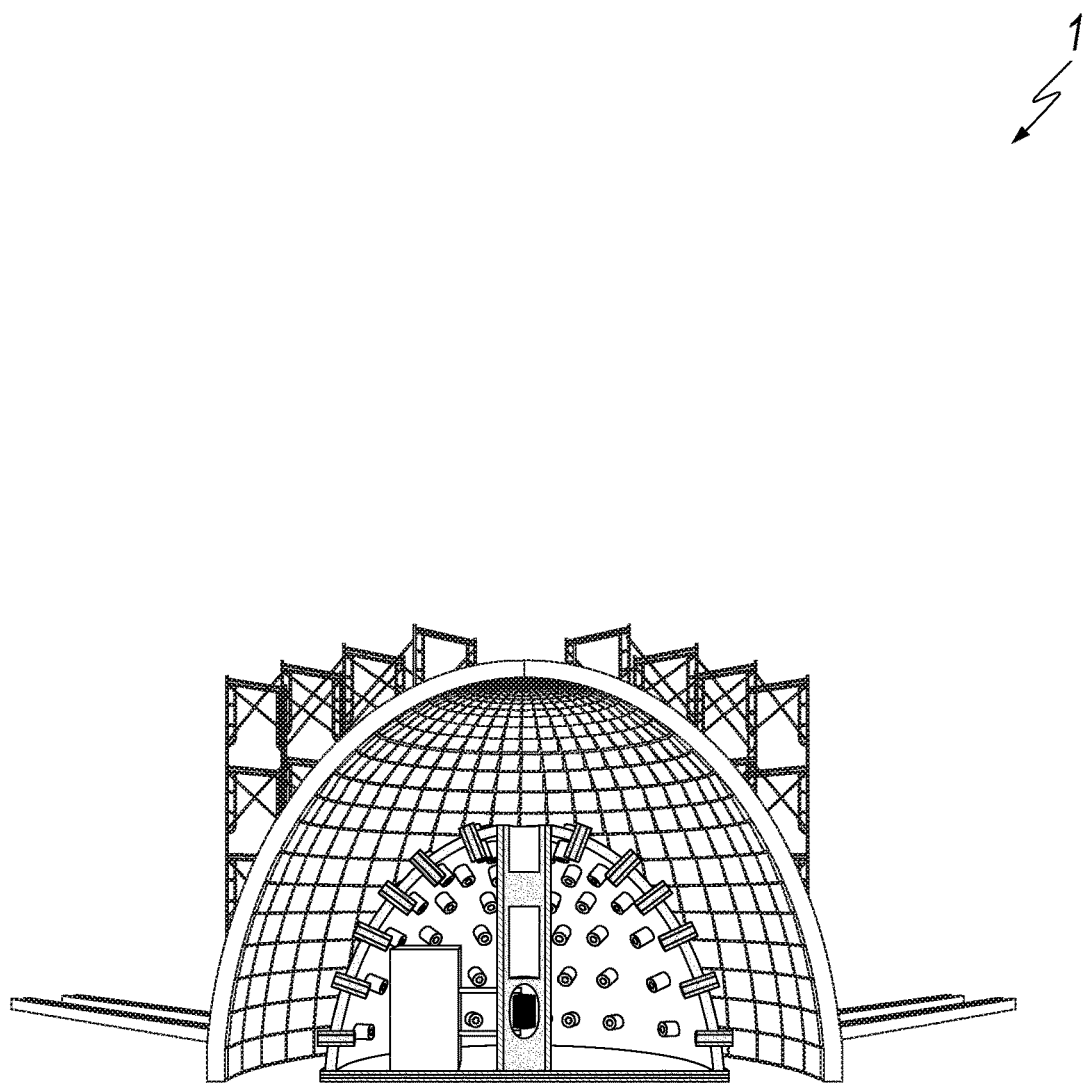
FIG. 7 is a cross sectional front view, taken along the dotted line shown in FIG. 6.
Figure 8:
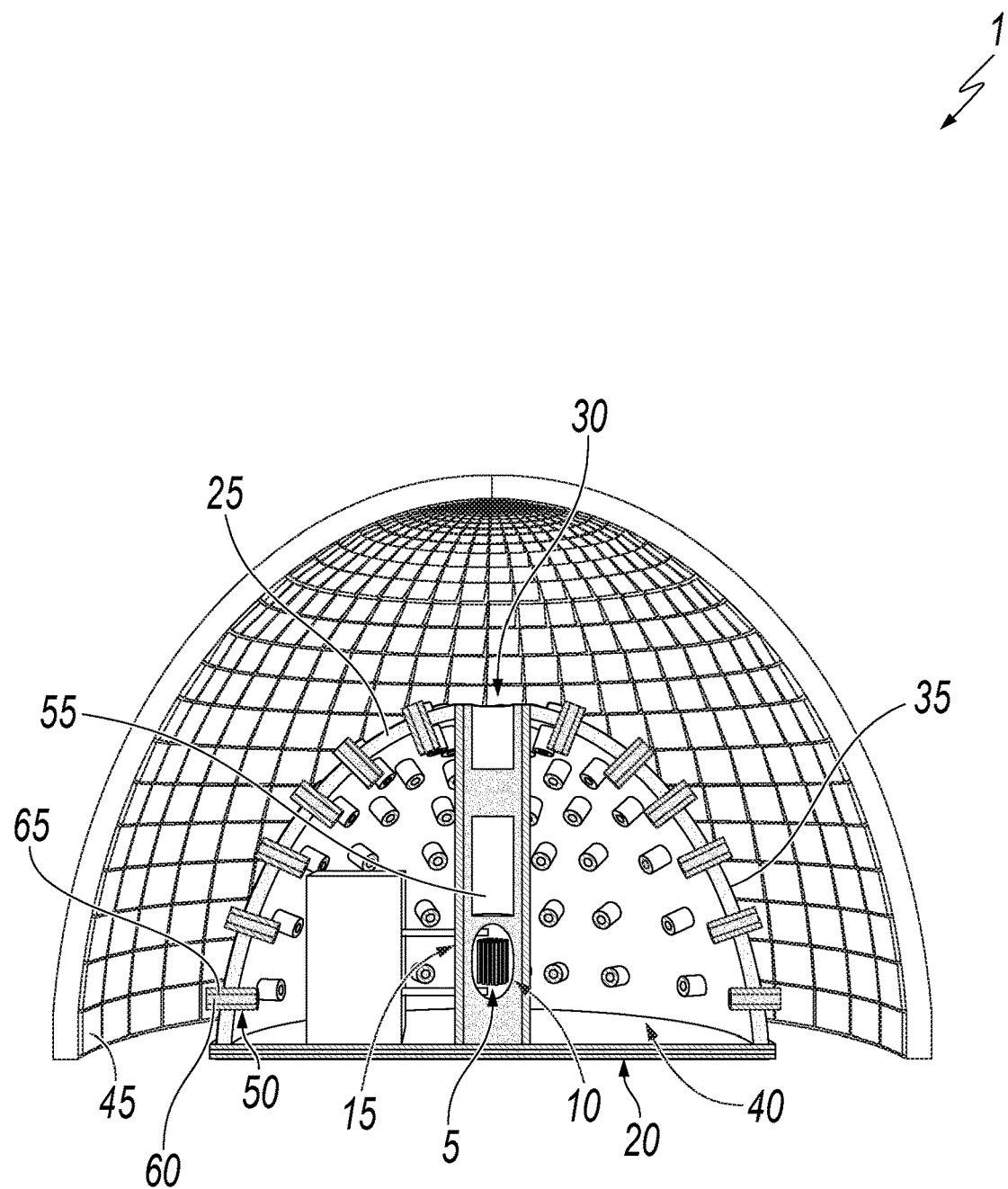
FIG. 8 is a close-up cross-sectional front view of FIG. 7.
Figure 9:
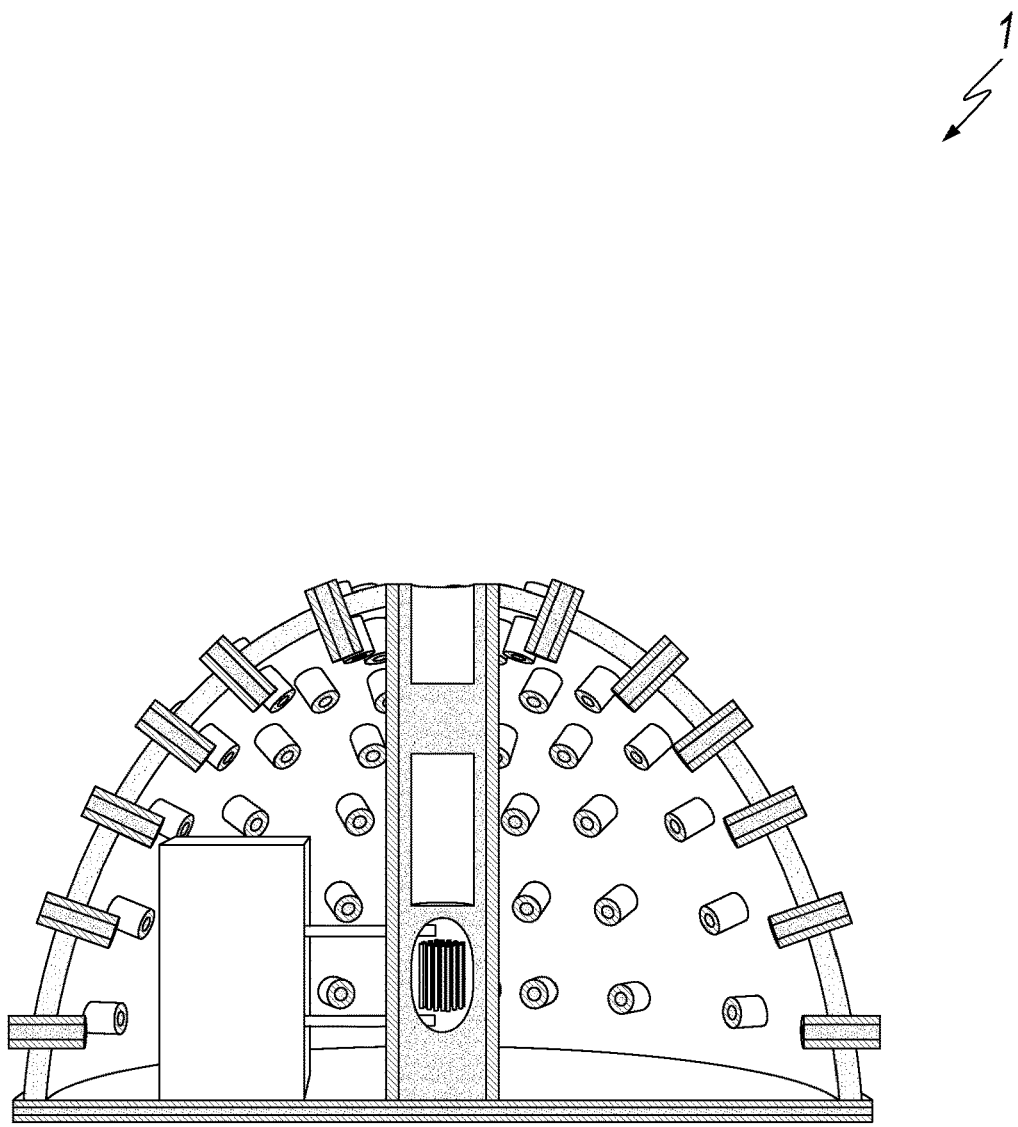
FIG. 9 is a close-up cross-sectional front view of FIG. 8.
Figure 10:
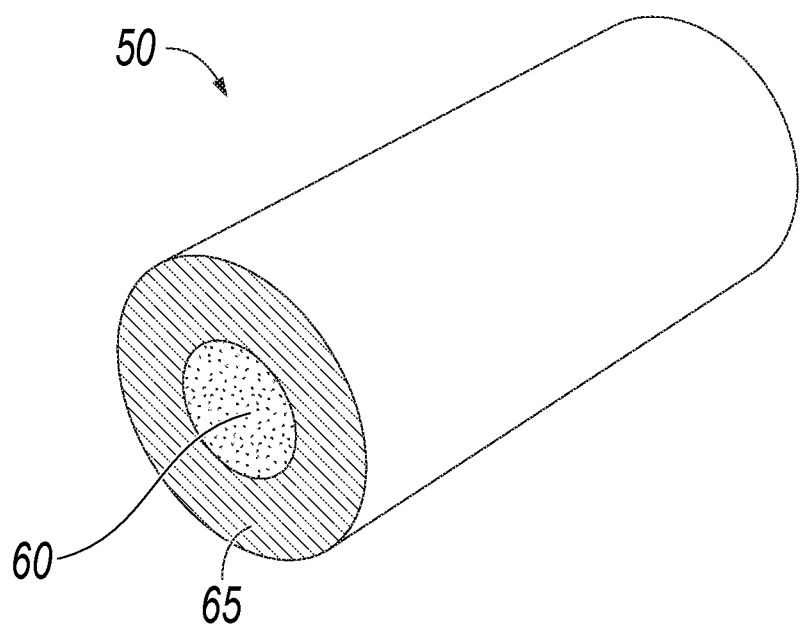
FIG. 10 is a top perspective view of a single heat pass segment.

FIG. 7 shows a detailed cross section of the inside of the system taken along a hemispherical plane perpendicular to the earth, as in the sectional view taken along FIG. 6. FIG. 8 shows a close-up and more detailed cross section of the inside of the system taken along a similar hemispherical plane, shown without the tracks and scaffolding. FIG. 9 takes a further close-up of the cross sections of FIG. 7 and FIG. 8, further omitting the layer of insulating tiles.

Note in FIG. 8 the bundle of radioactive fuel rods 5 sitting within a defined pressure vessel 10, which itself is cut from within heat pass column 15. A bottom inlet, not numbered, carries cool water into the pressure vessel. A top outlet, not numbered, carries hot water and steam out from the pressure vessel into a turbine, shown schematically as an unnumbered rectangle. It is this turbine which generates electricity that can be delivered to customers outside the system.

Vertically spaced above the pressure vessel 10 and also cut from within heat pass column 15 is a hollow access chamber 55. Operators enter here to service and manage the system. A door, not shown, allows operators inside chamber 55. Vertically spaced above hollow access chamber 55 is a cutout which opens to, and integrates with, the top 30 of inner containment dome. In the embodiment illustrated, there is this cutout and an opening in top 30 of the containment dome which exposes a layer of graphene to the space between the containment dome and the insulating tiles. In this embodiment, the heat pass column 15 cuts through the hole in top 30 of the containment dome. However, it is possible to create, and I contemplate, a configuration without the hole and the cutout. In this alternative configuration, top 30 of the containment dome has no such hole, and completely covers over the heat pass column 15.

Note the different layers of heat pass column 15. The innermost layer of all of these cutouts, the one in closest proximity to and defining, pressure vessel 10, hollow access chamber 55 and top of the heat pass column, is metal. This innermost layer of metal drawn as a simple line to show its thinness relative to the surrounding layers. Immediately surrounding the innermost layer of metal, and shown with stippling, is a layer of graphene. Graphene is known for superior tensile strength, elasticity as well as heat conductivity. Surrounding the graphene, and shaded in diagonal lines, is another layer of metal. These additional layers allow the pressure vessel to expand, rather than burst, under pressure of excess steam. Preferably, the metal chosen is steel, but other metals, such as iron, copper, and iron-graphene alloy, are possible and considered within the scope of this invention.

Supporting, and continuous with, heat pass column 15 is similarly layered heat pass disk 20. We see here too, two outer layers of metal, shown in diagonally shaded lines, surrounding an inner layer of graphene. Preferably, heat pass disk 20 is 30 inches thick, with each metal layer 2 inches thick and the graphene center layer 24 inches thick. Any heat or melted fuel that escapes the pressure vessel can pool into and atop the disk. The metal and graphene can absorb and contain the heat and nuclear reactions, so that they do not escape into the soil or water table outside the system.

Surrounding heat pass column 15 and heat pass disk 20 is hemispherical concrete containment dome 25. The top of column 15 intersects with the top 30 of dome 25, creating a torus of air space 40. Concrete is known for its ability to be shaped into rounded structures and for its strength. Preferably, dome 25 is 2-3 feet thick. To reinforce this strength and add further heat absorption means, I embed the concrete containment dome 25 at regular intervals along its sidewall 35 with a plurality of heat pass segments 50. Details of an individual heat pass segment 50 are shown in FIG. 9. Preferably, each segment comprises a cylinder 2-3 feet thick, with an 8-inch core 60 of graphene, wrapped in a 2-inch sheath 65 of metal. Most preferably, segments 50 are at least as long as concrete containment dome 25 is thick. Cutting the segments on the perpendicular creates two circular faces on opposite ends of the cylinder, each face revealing the core and sheath structure. Ideally, heat pass segments 50 are embedded into the concrete with one circular face exposed to air space 40, and the opposite circular face exposed to the space between concrete containment dome 25 and the layer of tiles 45. The graphene in this way channel excess heat and nuclear reactions to the atmosphere. The more surface area of graphene and metal that is exposed to heat, the more heat it can pass.

FIGS. 7-9 further show the spatial relationship between inner, concrete containment dome 25 and outer, layer of retractable insulating tiles 45. Preferably, the tiles are ceramic, storing and blocking from the atmosphere any heat not already dissipated by layered heat pass column, layered heat pass disk, concrete containment dome and embedded, layered heat pass segments. Should tiles 45 still not contain enough all of the built-up heat, they can be retracted outward along their corresponding tracks. This releases any heat to the earth's atmosphere, the ultimate dissipator.

Although embodiments and examples of the invention have been shown and described, it is to be understood that various modifications, substitutions, and rearrangements of parts, components, steps, as well as other uses, shapes, construction, and design of this system can be made by those skilled in the art without departing from the novel spirit and scope of this invention.

I claim:

1. A passive safety and cooling system for nuclear fission power plants having a bundle of radioactive fuel rods enclosed in a pressure vessel, comprising:
   a. a layered thermally conductive column surrounding and enclosing the pressure vessel, the column having a bottom and an opposing top;
   b. a layered thermally conductive disk supporting and continuous with the bottom of the layered thermally conductive column;
   c. a concrete containment dome having a top intersecting the top of the thermally conductive column, and sidewalls ending in a perimeter edge which intersects the thermally conductive disk, thereby enclosing and defining a torus of air space between the column, the disk and the sidewalls;
   d. a layer of insulating tiles spaced apart from and enclosing the top and the sidewalls of the concrete containment dome, wherein the layer of insulating tiles is selectively retractable from the concrete containment dome; and
   e. a plurality of layered thermally conductive segments embedded in the concrete containment dome and in thermal communication between the air space and the layer of insulating tiles.

2. The passive safety and cooling system of claim 1, wherein the layered thermally conductive column further surrounds and defines a hollow access chamber between the pressure vessel and the top of the concrete containment dome.

3. The passive safety and cooling system of claim 1, wherein the layered thermally conductive column and the layered thermally conductive disk both comprise a layer of graphene in between two layers of metal.

4. The passive safety and cooling system of claim 3, wherein the metal is selected from the group consisting of steel, iron, copper and iron-graphene alloy.

5. The passive safety and cooling system of claim 1, wherein each thermally conductive segment comprises a graphene core surrounded by metal.

6. The passive safety and cooling system of claim 5, wherein the metal is selected from the group consisting of steel, iron, copper and iron-graphene alloy.

7. The passive safety and cooling system of claim 1, wherein the insulating tiles are selected from the group consisting of fiberglass and silicon.

8. The passive safety and cooling system of claim 1, wherein the layered thermally conductive segments are evenly disposed around the sidewall, in discrete rows parallel to the thermally conductive disk.

9. The passive safety and cooling system of claim 8, wherein the layered thermally conductive segments are cylinders and oriented with one circular face facing into the air space and the opposing circular face facing the space between the concrete containment dome and the layer of insulating tiles.

10. A method of dissipating heat generated by nuclear fission power plants powered by a bundle of radioactive fuel rods, comprising the steps of:
    a. Enclosing and surrounding the bundle of radioactive fuel rods in a layered thermally conductive column;
    b. Standing the layered thermally conductive column atop a layered thermally conductive disk;
    c. Enclosing the layered thermally conductive column and the thermally conductive disk within a concrete containment dome having sidewalls embedded with a plurality of layered thermally conductive segments, thereby defining a torus of air space between the column, the disk and the sidewalls;
    d. Orienting the plurality of layered thermally conductive segments to be in thermal communication between the air space and an exterior of the concrete containment dome; and
    e. Enclosing the concrete containment dome within a layer of insulating tiles that is selectively retractable from the concrete containment dome.

11. The method of claim 10, wherein the layers of the thermally conductive column and the thermally conductive disk comprise metal, followed by a layer of graphene, followed by another layer of metal.

12. The method of claim 11, wherein the metal is selected from the group consisting of steel, iron, copper and iron-graphene alloy.

13. The method of claim 10, wherein the layers of the thermally conductive segment comprise a graphene core surrounded by metal.

14. The method of claim 13, wherein the metal is selected from the group consisting of steel, iron, copper and iron-graphene alloy.

15. The method of claim 10, wherein the insulating tiles are selected from the group consisting of fiberglass and silicon.

* * * * *